United States Patent

Tanaka et al.

[11] 4,075,312
[45] Feb. 21, 1978

[54] PROCESS FOR RECOVERING EVOLVED HYDROGEN ENRICHED WITH AT LEAST ONE HEAVY HYDROGEN ISOTOPE

[75] Inventors: John Tanaka, Storrs, Conn.; James J. Reilly, Jr., Bellport, N.Y.

[73] Assignee: The United States of America as represented by the United States Department of Energy, Washington, D.C.

[21] Appl. No.: 804,124

[22] Filed: June 6, 1977

[51] Int. Cl.² .................. C01B 4/00; C01B 1/00; C01G 6/24
[52] U.S. Cl. .................. 423/648 A; 423/644
[58] Field of Search .................. 423/648 A, 648, 644

[56] References Cited

U.S. PATENT DOCUMENTS

| 3,676,071 | 7/1972 | Speed | 423/648 |
| 3,711,601 | 1/1973 | Reilly, Jr. et al. | 423/648 A |

FOREIGN PATENT DOCUMENTS

| 2,602,326 | 7/1976 | Germany | 423/648 |

OTHER PUBLICATIONS

Inorganic Chemistry, vol. 13, No. 1, 1974, article by J. J. Reilly and R. H. Wiswall, Jr., pp. 218-222.

Theme Conference Proceedings, Mar. 18-20, (1974), Paper 54, pp. S4-9 to S4-20.

*Primary Examiner*—Edward Stern
*Attorney, Agent, or Firm*—Dean E. Carlson; Leonard Belkin

[57] ABSTRACT

This invention relates to a separation means and method for enriching a hydrogen atmosphere with at least one heavy hydrogen isotope by using a solid titanium alloy hydride. To this end, the titanium alloy hydride containing at least one metal selected from the group consisting of vanadium, chromium, manganese, molybdenum, iron, cobalt and nickel is contacted with a circulating gaseous flow of hydrogen containing at least one heavy hydrogen isotope at a temperature in the range of $-20°$ to $+40°$ C and at a pressure above the dissociation pressure of the hydrided alloy selectively to concentrate at least one of the isotopes of hydrogen in the hydrided metal alloy. The contacting is continued until equilibrium is reached, and then the gaseous flow is isolated while the temperature and pressure of the enriched hydride remain undisturbed selectively to isolate the hydride. Thereafter, the enriched hydrogen is selectively recovered in accordance with the separation factor (S.F.) of the alloy hydride employed.

9 Claims, 2 Drawing Figures

PROCESS FOR RECOVERING EVOLVED HYDROGEN ENRICHED WITH AT LEAST ONE HEAVY HYDROGEN ISOTOPE

STATEMENT OF GOVERNMENT INTEREST

This invention was made in the course of, or under a contract with the United States Energy Research and Development Administration.

CROSS REFERENCE TO RELATED APPLICATIONS

Concurrently filed, co-pending application.
Ser. No. 804,199, filed June 6, 1977, by James J. Reilly, the co-inventor herein, on "Titanium-Chromium Hydrides."

BACKGROUND OF THE INVENTION

The tritium (T) and deuterium (D) isotopes of hydrogen (H) hold great interest to workers in the field of nuclear energy. In the case of nuclear fission reactors, deuterium, which appears in hydrogen in nature at a concentration of 0.0156 mole percent (one part in 6410), forms a moderator in certain reactors, such as the HFBR at Brookhaven National Laboratory. Also, the presence of tritium in the hydrogen component of effluents from the fission reactors and their fuel reprocessing plants requires careful handling, since tritium, which only occurs in small traces (< than 1 ppm) in nature, has a radioactive half-life of about 12 years. In the case of fusion reactors and tokamaks or other "magnetic bottles" having utility in applications requiring high temperature plasmas, tritium and/or deuterium comprise suitable fuels.

By the term normal hydrogen or hydrogen (H) is meant the naturally occurring mixture of hydrogen isotopes having an atomic number of one. Deuterium (D) and tritium (T) are referred to as the heavy isotopes of hydrogen, and protium (P) is referred to as the light isotope of hydrogen (H).

The enrichment of (H) with its heavier isotopes for the separation, recovery or control of the latter, is accomplished in a variety of ways. The use of hydrides has been considered more than once before, since it has long been known that for many metals there are slight differences among the stabilities of their hydrides and tritides. An example described in U.S. Pat. No. 3,711,601, covers the use of vanadium hydride that becomes enriched in the deuteride and tritide relative to the ratio of the heavy isotope to the protium in the gas phase to remove small quantities of the heavy isotope from large quantities of hydrogen. Vanadium hydride has an "inverse" solubility relationship by which is meant that when the metal hydride equilibrates with a hydrogen mixture of protium and its heavier isotopes, the solid hydride phase becomes enriched in the heavy isotopes relative to the gas phase. In contrast, titanium has a "normal" relationship, by which is meant that enrichment of the heavy isotope is in the gas phase relative to the solid hydride phase.

For purposes of this disclosure, the solid hydride has a separation factor (S.F.) defined as the ratio $$\alpha = \frac{R_s/h_s}{R_g/H_g},$$

where $R_s$ = the concentration of the heavy isotope in the solid phase, $R_g$ = the concentration of the heavy isotope in the gas phase, $H_s$ = the concentration of protium in the solid phase, and $H_g$ = the concentration of protium in the gas phase.

SUMMARY OF THE INVENTION

It has now been discovered in accordance with this invention that certain titanium alloy hydrides have a large separation factor and can be used to enrich hydrogen with at least one hydrogen isotope. Moreover, this process can be run at near room temperature, quickly and/or in a simple apparatus. To this end, the process of this invention comprises the steps of selectively contacting a hydrided metal alloy consisting of titanium and at least one metal selected from the group consisting of vanadium, chromium, manganese, molybdenum, iron, cobalt, and nickel with a circulating gaseous flow of hydrogen containing at least one heavy isotope of hydrogen at a temperature in the range of $-20°$ to $+40°$ C and at a pressure above the dissociation pressure of the hydrided alloy selectively to concentrate at least one of the isotopes of hydrogen in the hydrided metal alloy, and isolating the gaseous flow while the temperature and pressure of the enriched, isolated hydride are undisturbed for selectively recovering the hydrogen enriched in the heavy isotope in accordance with the separation function (S.F.) of the alloy employed.

In one embodiment where the S.F. is greater than one, titanium is combined with chromium to form the alloy $TiCr_2$, as described in the above cited co-pending, concurrently filed application, Ser. No. 804,199, filed June 6, 1977, which is incorporated by reference herein. This alloy hydrides for selectively providing enrichment of tritium in the solid phase by a factor of about 2 × that of the gas phase. Thereupon, the desired heavy isotope of hydrogen, which is adsorbed from the gas on the solid by an exchange between the solid containing protium and the free gaseous tritium, can be reversibly removed by isolation and heating and/or reducing the pressure.

In one example of this embodiment, the hydride $TiCr_2H_x$ is contacted with an endlessly circulating hydrogen gas stream at a temperature between $-20°$ and $40°$ C and at a pressure above the dissociation pressure of the hydride until the ratio of the heavy hydrogen isotope to the protium in the hydride is greater than the same ratio in the gas phase. Thereafter, the steps comprise isolating the gaseous flow from the enriched hydride in a small amount of the contacting gas that maintains the temperature and pressure of the enriched hydride undisturbed, then decomposing the enriched hydride by reducing the pressure or by heating the enriched hydride to a temperature sufficient to cause decomposition thereof, and recovering the hydrogen enriched with the desired heavy isotope.

OBJECTS OF THE INVENTION

It is a principal object of this invention, therefore, to concentrate deuterium and/or tritium by contacting a gaseous flow of hydrogen with a titanium alloy hydride of the type described.

The above and further novel features and objects of this invention will appear more fully from the following detailed description of several embodiments when read in connection with the accompanying drawings, and the novel features will be more particularly pointed out in the appended claims. It is to be expressly understood, however, that the drawings are not intended as a definition of the invention, but are for the purpose of illustration only.

DESCRIPTION OF THE PREFERRED EMBODIMENT

The alloy hydride of this invention is useful for depleting a heavy hydrogen isotope (or isotopes) from a hydrogen gas to be treated, by concentrating the heavy isotope in the alloy hydride. Thereupon, the alloy hydride is useful for enriching a hydrogen atmosphere with the heavy hydrogen concentrated in the alloy hydride, by decomposing the alloy.

Figure 1:
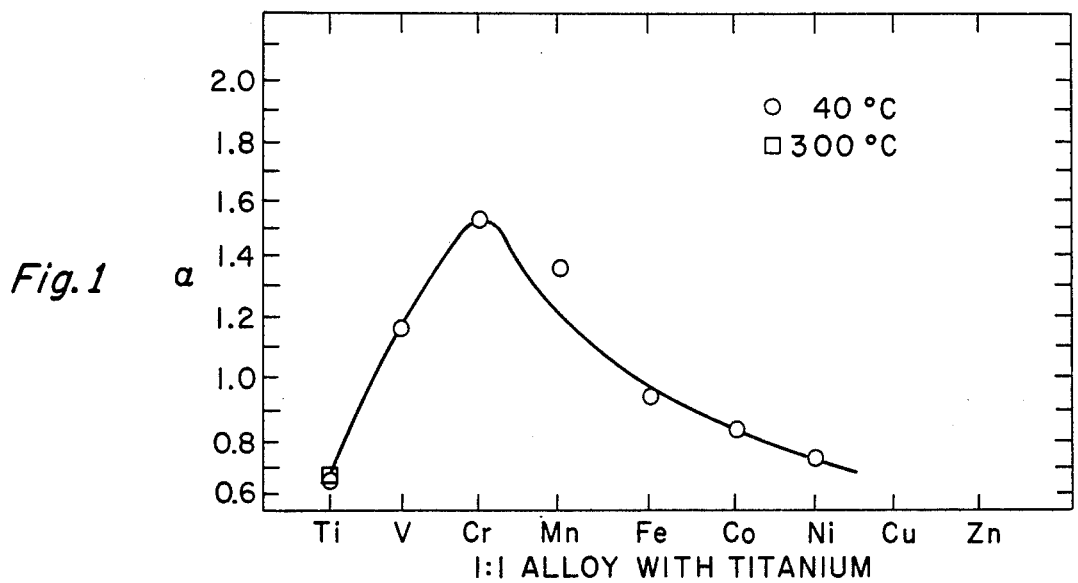
FIG. 1 is a graphic illustration of the separation factor S.F., which is represented by α, for selected 1:1 alloys of titanium.

An alloy of the type covered by this invention, which is understood from FIG. 1, may be prepared by placing ingots of titanium and the other metal component in proper proportions by weight in an electric arc furnace and heating the mixture in an inert atmosphere such as argon until the mixture is completely molten. The mixture is maintained molten while being mixed and then is allowed to cool. The resulting alloy is found to have the composition of the original constituents placed in the furnace. A further description of the method for making the titanium alloy hydride of this invention is described in the above cited co-pending application Ser. No. 804,199, filed June 6, 1977, which is incorporated by reference herein.

As described briefly in the examples herein, the solid, titanium alloy hydride may be prepared by reacting metal alloy previously prepared in the form of a finely divided solid with gaseous hydrogen in a high-pressure reactor. To this end, the titanium alloy is exposed to a flow of normal gaseous (H) to form the hydride. Then, the hydrided alloy is contacted with gaseous hydrogen containing protium and higher than normal amounts of deuterium or tritium to be depleted, such as from a nuclear reactor effluent, under a pressure that is higher than the dissociation pressure of the hydrided alloy at any temperature where exchange is taking place. This temperature is found not to be critical but should be in the range of −20° to +40° C because of certain practical considerations. At temperatures less than −20° C, for example, the kinetics are such that the process slows down to a low rate when absorbing the heavy isotope on the hydride. As the higher end of the temperature range is reached, the reaction occurs at a greater rate but the S.F. declines to a level that approaches one, and this makes the process relatively unproductive because as the S.F. approaches one the ratio of the heavier isotope to the protium in the solid hydride becomes the same as the same ratio in the gas phase. Because the S.F. increases as the temperature at which the absorption process is conducted is lowered, it is seen that it may be expedient to carry out the exchange reaction step at ambient temperature or lower.

After equilibrium conditions are reached as evidenced by measuring samples of the gas phase until an unchanging isotope composition is reached, the circulating gas flow is isolated from the alloy hydride by suitable valves, while the temperature and pressure of the enriched hydride system remains undisturbed. The solid is decomposed by vacuum, and/or by heating to a temperature sufficient to cause its decomposition, and the evolving gases are collected, so that the evolved gas is richer in D or T than the contacting gas.

Figure 2:
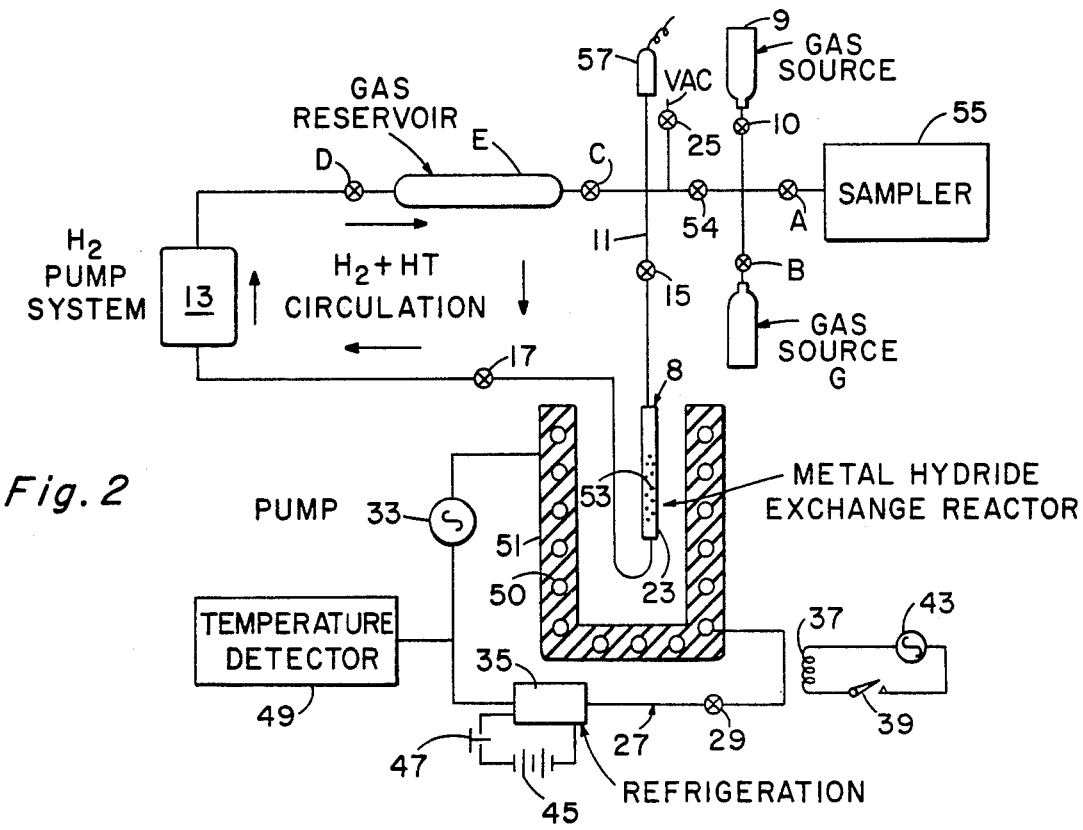
FIG. 2 is a partial schematic view of one embodiment of the system of this invention.

In the practical arrangement of a reactor 8 that is shown in FIG. 2, the circulation of the normal hydrogen gas from a source 9 having a valve 10, or the heavy isotope to be depleted from hydrogen gas from source G having a valve B, is produced in a loop 11 by a pump 13. The loop has suitable back-up valves A, C and D, and a gas reservoir E. Another back-up valve 54 may also be provided. Upon reaching equilibrium valves 15 and 17 close to isolate the flowing gas in the loop 11 from the hydride in the pressure vessel 23. After the heavy isotope is concentrated by exchange and absorption in the hydride from the gas to be depleted, the hydride is decomposed to remove the enriched gas through valve 25.

Temperature control is provided by a heater-cooler 27 having a standard valve 29, pump 33, refrigerator 35 and heater 37. The heater has a switch 39 and power source 43, and the refrigerant has a power source 45 and an off-on switch 47 for control purposes. Also, a standard temperature detector 49 is used. The heat exchange fluid circulates from either the refrigerator or the heater continuously in tubes 50 in an enclosure 51 containing the reactor vessel 23 and alloy 53. Vacuum is supplied through valve 25, if desired.

The sampler 55 suitably detects the tritium in the loop 11 by proportionally counting the radioactive disintegrations/unit time, or other standard means detect the T and/or D.

Detector 57 is a suitable pressure-sensitive detector for the gas in loop 11.

In operation, the desired titanium alloy 53 is made from the mentioned metals and hydrided by standard means. Using an alloy in the range of TiCr to $TiCr_3$ (i.e., 25 to 50 atom % Ti) whose S.F. is > 1, for example, the container 23 is opened by standard means, the alloy is inserted in the container, and is closed in loop 11. Then with four valves A, C, D, 10, 54 and 15 open, and the other three valves 17, 25 and B closed, natural hydrogen from source 9 is adsorbed by the alloy 53. Then while valves B and 17 remain closed, valves 15 and 10 are closed and valve 25 is opened to evacuate the loop 11. Then while valve 10 remains closed, valve 25 is closed and valves 15, 17 and B are opened to fill loop 11 from source G with the $H_2$ gas containing T (or D) to be treated by depletion of the heavy hydrogen isotope. Then valve B is closed and the gas is circulated in loop 11 at the desired pressure and temperature.

The temperature of alloy 53 is adjusted with heater-cooler 27. To this end, switch 39 closes to heat the reactor 23 and its contents in enclosure 51 by circulating heated heat transfer fluid in tubes 50, or to cool the same with refrigerator 35 in like manner.

Pump 13 is actuated to circulate the hydrogen and heavy hydrogen isotope until the alloy hydride 53 in reactor 23 reaches an equilibrium by exchanging the hydrogen isotope and protium between the alloy hydride and the contacting gas.

When the S.F. is greater than one the exchange to equilibrium causes the contacting gas to be depleted in the heavy hydrogen isotope and the solid alloy hydride 53 to be enriched in the heavy isotope. Thus, after equilibrium, valves 15 and 17 are closed to isolate the enriched hydride from the circulating gas. The gas in the remainder of the loop is removed by evacuation. Then valve 15 is opened and the solid hydride is heated and decomposed, to evolve the enriched hydrogen, which can be recovered through valve 25 or through valve A by removing the sampler and supplying a vacuum instead.

When the S.F. is either more or less than one, and changes rapidly with temperature, tritium (and/or deuterium) can also be concentrated in the hydride by alternately changing the temperature of the contacting gas to change the S.F. back and forth in a series of steps. The process can be run continuously in the desired direction by using the appropriate titanium alloy, and by using a series of successive stages that are operated countercurrently. To this end, a plurality of respective loops and high pressure reactors containing the alloy with the desired S.F. are connected in series or operated with the desired S.F. sequentially at different temperature and/or pressure conditions alternately periodically to enrich and/or to deplete the contacting gaseous flow as desired. For example, the S.F. can thus be changed from 0.5 to 0.9 during which time the desired exchange takes place.

EXAMPLE I

Tritium-Hydrogen Exchange with $TiCr_2H_{1.68}$ 2.8352 g titanium and 6.1564 g chromium were weighed out. The metals were melted in an arc furnace. The melting process involved turning the initially melted button over and remelting. The alloy was then crushed in a steel mortar and sieved through a 20 mesh screen. The material, which passed through the 20 mesh screen (8.4707 grams), was placed in a cylindrical reactor vessel, which was designed so that the material was confined between two sintered nickel discs. The vessel was then introduced into a gas circulation loop. The reactor was subjected to 750 psi hydrogen pressure and intermittently heated to about 100° C with a hand torch. After about a half hour, the pressure was relieved and the system evacuated. The reactor was then heated with a furnace to 400° while open to the vacuum. After all the hydrogen was pumped off, the reactor was cooled to room temperature and 750 to 800 psi hydrogen was again introduced until the pressure was ~800 psi. Most of the hydrogen absorbed was taken up within the first half hour. After several hours at 800 psi, the reactor was cooled with liquid nitrogen and evacuated. The reactor was then heated with a tube furnace to 450° and the amount of hydrogen evolved from the solid measured. The material was then rehydrided as above.

EQUILIBRATION WITH TRITIUM

After hydriding, the reactor was cooled to −20°C at which point the pressure was dropped from approximately 800 psi to 225 psi. An 80 ml gas reservoir was isolated from the system and evacuated. A tritium hydrogen mixture was added to the reservoir. After the tritium-hydrogen mixture was introduced into the reservoir, the reservoir was pressurized to 225 psi with normal hydrogen. The tritium-hydrogen gas in the reservoir was mixed until it was homogeneous, as determined by sampling the mixture periodically and measuring the tritium activity. At this point, the reservoir was then opened to the loop and the gas was continually circulated around the loop by a gas pump. Gas samples were taken periodically until the tritium concentration in the gas phase was constant, thus indicating that equilibrium was established as indicated by the constancy of counts vs. time. The reactor containing the solid enriched hydride phase was isolated and the gas in the remainder of the loop was removed. The solid in the reactor was then thermally decomposed so as to evolve the desired hydrogen enriched in tritium. The gas evolved during the decomposition step was collected, measured and its tritium content determined. The results of this experiment are summarized below in Table I.

EXAMPLE II

A similar experiment was conducted using ternary titanium alloy hydrides having the following composition: $TiCr_2H_{1.48}$. At an experimental temperature of 0° C the separation factor was found to be 2.03, as shown in Table II.

EXAMPLE III

A similar experiment was conducted with hydrides of the following titanium alloys: TiCrMn, $TiMo_2$, $TiCr_3$, $Ti_2Mo$, TiMo, TiCr, TiMn, TiV, $Fe_{.6}TiMn_{.2}$, FeTi, TiCo, and TiNi. The results are shown in Table II.

As understood in the art, the (S.F.) separation factors of D and T are of a similar order of magnitude.

EXAMPLE IV

The steps of Examples I - III are repeated in the following sequences:
1. Alloy open to $H_2$ pressure;
2. Hydride is isolated from circulation loop;
3. Circulation loop is evacuated;
4. Circulation loop is filled with normal (naturally occurring) hydrogen having tritium added thereto to between 300 and 400 psi in loop;
5. Hydrogen and tritium are thoroughly mixed in circulation loop;
6. Circulating mixture contacts ternary titanium alloy hydride in endless loop;
7. Tritium in gas phase is exchanged with protium in solid phase for up to 3 - 4 days until all of H isotopes in gas phase reach equilibrium, as measured by small sampling that only reduces pressure a small amount (10 - 20 psi);
8. Then the tritium enriched solid alloy hydride is isolated from the gas circulation;
9. The tritium depleted gas isolated in the loop is removed by evacuation;
10. The hydride is decomposed by heating and vacuum to evolve tritium enriched hydrogen therefrom;
11. The evolved tritium enriched hydrogen from the decomposition is collected;
12. The collected gas is measured;
13. The alloy is dehydrided for the beginning of a new cycle for concentrating tritium and/or deuterium in hydrogen by enriching one hydrogen atmosphere and depleting another due to an exchange from the gaseous phase to the solid phase.

EXAMPLE V

In a similar experiment, hydrided alloys consisting of the amounts of titanium and the other Group 5, 6 and 7 metal alloy constituents listed in Table II were used. The other alloy constituents, comprising metals selected from the group consisting of vanadium, chromium, manganese, molybdenum, iron, cobalt and nickel were contacted selectively by circulating in a closed loop a gaseous flow of protium in an endless stream containing at least one heavy isotope of hydrogen at a temperature in the range of −20° to 40° C and at a pressure above the dissociation pressure of the hydrided alloy selectively to concentrate one of the light or heavy isotopes of hydrogen in the hydrided metal alloy or the contacting gas respectively in accordance with the S.F. values listed in the Table II selectively so as to be in the solid phase when the S.F. of the alloy was greater than one and in the gas phase when the S.F. of the alloy was less than one.

The contacting was continued until equilibrium was reached, and then the circulation of the gaseous flow was isolated from the enriched alloy hydride, while the temperature and pressure of the enriched alloy were undisturbed so as to isolate the alloy containing the concentrated isotope from the circulation of the gaseous flow. Thereafter, the hydrogen enriched with the heavy isotope was selectively recovered from the heavy isotope containing hydrided alloy, which was selectively heated to a temperature sufficient to cause the decomposition thereof in isolation from the gaseous flow of hydrogen in the circulating gas stream in accordance with the S.F. of the alloy hydride employed. Stated another way, the useful products selectively provided were the equilibrium hydrided metal alloy or the enriched hydrogen atmosphere produced by the described process respectively.

The enriching was in accordance with the values of the S.F. listed in the TABLE II. To this end, when the S.F. of the alloy was more than one the heavy isotopes were selectively concentrated in the solid phase for release upon heating or by pressure reduction.

The heating of the alloy renewed the alloy for rehydriding in the same or a like hydrogen to the inititally contacting natural hydrogen. When the S.F. was one, there was equal concentration in both the solid and gaseous phases.

EXAMPLE VI

The steps of Example V were repeated using equal parts of Fe and Ti, which were melted, cooled, ground, and hydrided in natural hydrogen in several runs to form $FeTiH_{1.88}$, $FeTiH_{1.69}$ and $FeTiH_{1.21}$ respectively. The hydrided alloy was placed in a reactor through which a stream of hydrogen containing the heavy isotope T in known greater amounts than in nature was circulated in a gaseous flow above the dissociation pressure from a suitable source at 0° C to concentrate the protium from the flow in the hydrided alloy, thus to concentrate the T in the gas flow by depletion of the protium therefrom.

By natural hydrogen is meant natural hydrogen produced by electrolysis of water containing a concentration of 0.0156 mole percent (one part in 6410) of D and L less than 1 ppm of T.

The S.F. in several runs of this example were .92 and .95 respectively at 0° C. At 40° C the S.F. was 1.0.

EXAMPLE VII

The steps of Example VI were repeated in which the alloy was made from 0.6 parts Fe, 1 part Ti and 0.2 parts Mn and hydrided to form $Fe_{0.6}TiMn_{0.2}H_{1.67}$. The hydrided alloy had a S.F. of 1.0 at 40° C.

EXAMPLE VIII

The steps of Example VII were repeated using equal parts Ti and Co, which was hydrided to form $TiCoH_{1.44}$ having a S.F. of .852 at 40°.

EXAMPLE IX

The steps of Example VIII were repeated using equal parts of Ti and Ni, which were hydrided to form $TiNiH_{1.44}$ having a S.F. of 0.74 at 40° C.

EXAMPLE X

In similar examples where the S.F. was greater than one for concentrating the D and T in the solid phase, the composition corresponded to 25 at % Ti and 75 at % Cr. This alloy was prepared in the above described manner and hydrided on several experiments to form $TiCr_3H_{1.76}$, $TiCr_3H_{1.36}$ and $TiCr_3H_{0.875}$ having S.F.'s of 1.68, 1.59 and 1.69 respectively at −20° and 0° C.

EXAMPLE XI

The steps of Example X were repeated using one part of Ti to two parts of Cr. The hydrided alloys formed in several runs had the compositions of $TiCr_2H_{1.68}$, and $TiCr_2H_{1.48}$ with S.F.'s of 2.01 and 2.03 respectively at −20° C and 0° C.

EXAMPLE XII

The steps of Example XI were repeated using equal parts of Ti, Cr and Mn in several runs to form the hydrided alloy $TiCrMnH_{2.19}$ and $TiCrMnH_{1.28}$, which had a S.F.'s of 2.05 and 1.80 respectively at −20° and 0° C.

EXAMPLE XIII

The steps of Example XII were repeated using equal parts of Ti and Mn to form the hydrided alloy $TiMnH_{1.99}$ having a S.F. of 1.37 at 40° C.

EXAMPLE XIV

The steps of Example XIII were repeated using equal parts of Ti and Mo, which formed $TiMoH_{2.99}$ having a S.F. of 1.61 at 40° C.

EXAMPLE XV

The steps of Example XIV were repeated using equal parts of Ti and Cr to form the hydride $TiCrH_{2.35}$, which had a S.F. of 1.54 at 40° C. In this example, the starting alloy had a composition corresponding to 50 at % Ti and 50 at % Cr.

EXAMPLE XVI

The steps of Example XV were repeated using equal parts of Ti and V, which formed the hydride $TiVH_{4.15}$ having a S.F. of 1.18 at 40° C.

EXAMPLE XVII

The steps of Example XVI were repeated using two parts Ti and one part Mo to form $Ti_2MoH_{4.77}$ having a S.F. of 1.61 at 40° C.

EXAMPLE XVIII

The steps of Example XVII were repeated using one part Ti and two parts Mo to form $TiMo_2H_{1.10}$ having a S.F. of 1.87 at −20° C.

EXAMPLE XIX

Equimolar amounts of titanium, chromium and manganese were melted into an approximately 10 g button. The material was crushed to pass through a 20 mesh screen. This alloy took up hydrogen very easily, not requiring the activation by cycles of pressurizing, evacuating and heating required for some alloys. The equilibration with tritium was the same as for the $TiCr_2$ alloy.

EXAMPLE XX

Equimolar amounts of titanium and nickel were melted into approximately a 10 g button. The button was rather difficult to crush. After much hammering in a steel mortar, the material was reduced to 20 mesh or less. After several activation cycles of heating to 450° and admitting 100 psi or less of hydrogen followed by evacuation as well as pressurizing to 500 psi and heating gently, the material began to take up hydrogen relatively rapidly.

The analysis of hydrogen content and equilibration with tritium were the same as for the $TiCr_2$ alloy.

TABLE I
RESULTS OF EXAMPLE I

| | |
|---|---|
| Total initial activity (counts/min of tritium) | $1.285 \times 10^7$ |
| Final activity in gas phase at equilibrium | $0.639 \times 10^7$ |
| Final activity in solid hydride phase at equilibrium | $0.489 \times 10^7$ |
| Activity removed by sampling | $0.032 \times 10^7$ |
| Material Balance = $\frac{\text{Total T found}}{\text{Total T added}}$ = 90.2% | |
| Final amount of hydrogen in gas phase | 0.1221 mols |
| Final amount of hydrogen in solid phase | 0.04642 mols |
| Separation factor (S.F.) = $\frac{T_{solid}/H_{solid}}{T_{gas}/H_{gas}} = \frac{0.489 \times 10^7/0.04642}{0.639 \times 10^7/0.1221} = 2.01$ | |

TABLE II
TRITIUM ISOTOPE EFFECTS

| Material Equilibrated | Max. H | Temp. | Activity Balance (%) | (α) (Separation Factor) | Structure of Alloy |
|---|---|---|---|---|---|
| $FeTiH_{1.88}$ | $H_{1.97}$ | 0° | 95 | .92 | CsCl a = 2.976 Elliott 438 |
| $FeTiH_{1.69}$ | $H_{1.97}$ | 0° | 97 | .95 | |
| $FeTiH_{1.21}$ | $H_{1.97}$ | 40° | 105 | 1.0 | |
| $Fe_{0.6}TiMo_{0.2}H_{1.67}$ | $H_{1.75}$ | 40° | 101 | 1.0 | |
| $TiCoH_{1.44}$ | $H_{1.46}$ | 40° | 98 | .852 | CsCl a + 2.987 to 2.994 Elliott 340 |
| $TiNiH_{1.44}$ | $H_{1.50}$ | 40° | 99 | .74 | CsCl a = 3.013 to 3.015 Hansen 1052 |
| $TiCr_3H_{1.76}$ | $H_{2.91}$ | −20° | 98 | 1.68 | $TiCr_2$ + Cr |
| $TiCr_3H_{1.36}$ | $H_{2.91}$ | 0° | 100 | 1.59 | |
| $TiCr_3H_{0.875}$ | $H_{2.91}$ | +20° | 95 | 1.69 | |
| $TiCr_2H_{1.68}$ | $H_{2.66}$ | −20° | 90 | 2.01 | fcc $MgCu_2$ a = 6.943. At temp. hexagonal $MgZn_2$ a = 4.932 c = 7.961 |
| $TiCr_2H_{1.48}$ | $H_{2.66}$ | 0° | 97 | 2.03 | |
| $TiCrMnH_{2.19}$ | $H_{2.91}$ | −20° | 99 | 2.05 | $TiCr_2$ pattern |
| $TiCrMnH_{1.28}$ | $H_{2.91}$ | 0° | 105 | 1.80 | |
| $TiMnH_{1.99}$ | $H_{2.21}$ | 40° | 93 | 1.37 | |
| $TiMoH_{2.99}$ | $H_{2.99}$ | 40° | 100 | 1.61 | Solid solution |
| $TiCrH_{2.35}$ | $H_{2.92}$ | 40° | 88 | 1.54 | X-ray pattern similar to TiMo |
| $TiVH_{4.15}$ | $H_{4.0}$ | 40° | 93 | 1.18 | |
| $Ti_2MoH_{4.77}$ | $H_{N4.94}$ | 40° | 100.8 | 1.61 | Solid solution bcc |
| $TiMo_2H_{1.10}$ | $H_{1.31}$ | −20° | 96.8 | 1.87 | Solid solution bcc |

What is claimed is:

1. The process of enriching a hydrogen atmosphere with at least one heavy hydrogen isotope, comprising the steps of:
   a. selectively contacting an alloy hydride of titanium and at least one metal selected from the group of metals consisting of vanadium, chromium, manganese and molybdenum with a gaseous flow of hydrogen containing protium and at least one heavy isotope of hydrogen at a temperature in the range of −20° to 40° C and at a pressure above the dissociation pressure of the solid hydride phase until the ratio of the heavy hydrogen isotope to protium in the solid hydride phase is greater than the same ratio in the gas phase to selectively concentrate at least one of the heavy isotopes in the hydrided metal alloy;
   b. thereafter isolating the enriched hydride from the gas stream while the temperature and pressure of the enriched hydride are undisturbed;
   c. then decomposing the enriched isolated hydride to evolve enriched hydrogen; and
   d. recovering the evolved hydrogen enriched with the heavy isotope that is produced by the decomposing.

2. The process of claim 1 in which the solid titanium hydride has a S.F. greater than one.

3. The process of claim 1 in which the contacting continues until equilibrium is reached with a gas containing protium and tritium.

4. The process of claim 1 in which the titanium is alloyed with Cr.

5. The process of claim 4 in which the Ti content varies from 25 to 50 atom %.

6. The process of claim 1 in which the hydride alloy is $TiCr_2H_{1.68}$.

7. The process of claim 1 in which the hydride formed is $TiCr_2H_{1.48}$.

8. The process of enriching a protium atmosphere with at least one heavy hydrogen isotope, comprising the steps of:
   a. alloying titanium with at least one metal selected from the group of metals consisting of V, Cr, Mn, Mo, Fe, Co and Ni having an alloy hydride hydrogen separation factor greater than one;
   b. hydriding the alloy with protium;
   c. selectively contacting the alloy hydride at a pressure above the dissociation pressure of the hydrided alloy with a protium treating gas containing higher than normal amounts of at least one heavy isotope of hydrogen at a temperature in the range of up to 40° C to enrich the hydrided alloy in at least said one isotope;
   d. isolating the enriched hydrided alloy; and
   e. decomposing the isolated enriched alloy to produce the enriched atmosphere.

9. The process of enriching a protium containing hydrogen atmosphere with at least one heavy hydrogen isotope, comprising the steps of:
   a. selectively contacting a hydrided titanium metal alloy with a circulating gaseous stream of protium containing higher than normal amounts of at least one heavy isotope of hydrogen at a pressure above the dissociation pressure of the hydrided alloy at a temperature where enrichment is taking place selectively to concentrate at least one of the heavy isotopes of hydrogen in the hydrided metal alloy;

b. continuing said contacting until equilibrium is reached;
c. isolating the enriched metal alloy hydride from the gas stream while the temperature and pressure of the enriched metal alloy hydride are undisturbed; and
d. decomposing the isolated enriched metal alloy hydride for selectively recovering hydrogen enriched in the heavy isotope;
e. the titanium being alloyed with at least one metal selected from the group consisting of V, Cr, Mn, Mo, Fe, Co and Ni.

* * * * *